(12) United States Patent
Wang et al.

(10) Patent No.: US 11,416,534 B2
(45) Date of Patent: Aug. 16, 2022

(54) CLASSIFICATION OF ELECTRONIC DOCUMENTS

(71) Applicant: FUJITSU LIMITED, Kawasaki (JP)

(72) Inventors: Jun Wang, San Jose, CA (US); Kanji Uchino, Santa Clara, CA (US)

(73) Assignee: FUJITSU LIMITED, Kawasaki (JP)

(*) Notice: Subject to any disclaimer, the term of this patent is extended or adjusted under 35 U.S.C. 154(b) by 134 days.

(21) Appl. No.: 16/208,321

(22) Filed: Dec. 3, 2018

(65) Prior Publication Data

US 2020/0175052 A1 Jun. 4, 2020

(51) Int. Cl.
*G06F 16/34* (2019.01)
*G06F 16/35* (2019.01)
*G06N 20/00* (2019.01)
*G06F 16/31* (2019.01)

(52) U.S. Cl.
CPC .......... *G06F 16/358* (2019.01); *G06F 16/313* (2019.01); *G06F 16/34* (2019.01); *G06N 20/00* (2019.01)

(58) Field of Classification Search
None
See application file for complete search history.

(56) References Cited

U.S. PATENT DOCUMENTS

| | | | | |
|---|---|---|---|---|
| 4,972,349 A * | 11/1990 | Kleinberger | ............ | G06F 16/30 |
| 8,548,995 B1 * | 10/2013 | Curtiss | .................. | G06F 16/951 |
| | | | | 707/726 |
| 9,110,984 B1 * | 8/2015 | Lewis | ................... | G06F 16/355 |
| 2004/0093557 A1 * | 5/2004 | Kawatani | ...................... | 715/255 |
| 2009/0083200 A1 * | 3/2009 | Pollara | ................... | G06N 20/00 |
| | | | | 706/14 |

OTHER PUBLICATIONS

Screencapture of DOS dir [captured on Oct. 6, 2021], USPTO, 1 page.*
Screencapture of INSTALL.LOG [captured on Oct. 6, 2021], USPTO, 1 page.*
Fisher, What Is Windows 10? Oct. 7, 2021, lifewire, https://www.lifewire.com/windows-10-2626217.*

(Continued)

*Primary Examiner* — Yu Zhao
(74) *Attorney, Agent, or Firm* — Maschoff Brennan

(57) ABSTRACT

A method may include obtaining multiple electronic documents and multiple topics associated with the electronic documents. The method may further include determining a similarity between a first topic and a second topic. The first topic may be associated with a first set of electronic documents. The method may further include refining the multiple topics based on the similarity between the first topic and the second topic by associating the first set of the electronic documents with the second topic and removing the first topic from the multiple topics. The method may further include building a document-classifier model by applying machine learning to at least one electronic document associated with each of the refined topics. The method may further include obtaining an electronic document and classifying the electronic document into one of the refined topics using the document-classifier model.

16 Claims, 6 Drawing Sheets

(56) References Cited

OTHER PUBLICATIONS

Li et al., "Effective Document Labeling with Very Few Seed Words: A Topic Model Approach", In Proceedings of the 25th ACM International on Conference on Information and Knowledge Management (CIKM '16). ACM, New York, NY, USA, 85-94, Oct. 24, 2016. DOI: https://doi.org/10.1145/2983323.2983721.
Poursabzi-Sangdeh et al., "ALTO: Active Learning with Topic Overviews for Speeding Label Induction and Document Labeling", Association for Computational Linguistics, Aug. 7, 2016.
Yang et al., "A Simple Regularization-based Algorithm for Learning Cross-Domain Word Embeddings", Proceedings of the 2017 Conference on Empirical Methods in Natural Language Processing, pp. 2898-2904, Sep. 7, 2017, EMNLP-2017.

\* cited by examiner

CLASSIFICATION OF ELECTRONIC DOCUMENTS

FIELD

The embodiments discussed in the present disclosure are related to classifying electronic documents.

BACKGROUND

Businesses and institutions generate, receive, and store large numbers of electronic documents, such as electronic documents in format including ".txt," "doc," "pdf," and "html." These electronic documents may be retrieved for viewing by users of the businesses and institutions among others. Many times, the electronic documents are not classified based on the subject matter that the electronic documents include.

SUMMARY

A method of classifying an electronic document may include obtaining multiple electronic documents and multiple topics associated with the electronic documents. The multiple topics may be associated with the multiple electronic documents such that each topic may be associated with at least one electronic document and each electronic document may be associated with at least one topic. The method may further include determining a similarity between a first topic of the multiple topics and a second topic of the multiple topics. The first topic may be associated with a first set of electronic documents of the multiple electronic documents. The method may further include refining the multiple topics based on the similarity between the first topic and the second topic. The refining may include associating the first set of the electronic documents with the second topic and removing the first topic from the multiple topics. The method may further include building a document-classifier model by applying machine learning to at least one electronic document of the multiple electronic documents associated with each of the refined topics. The document-classifier model may be configured to classify electronic documents according to the refined topics. The method may further include obtaining an electronic document not of the multiple electronic documents and classifying the electronic document into one of the refined topics using the document-classifier model.

The object and/or advantages of the embodiments will be realized or achieved at least by the elements, features, and combinations particularly pointed out in the claims.

It is to be understood that both the foregoing general description and the following detailed description are given as examples and explanatory and are not restrictive of the present disclosure, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
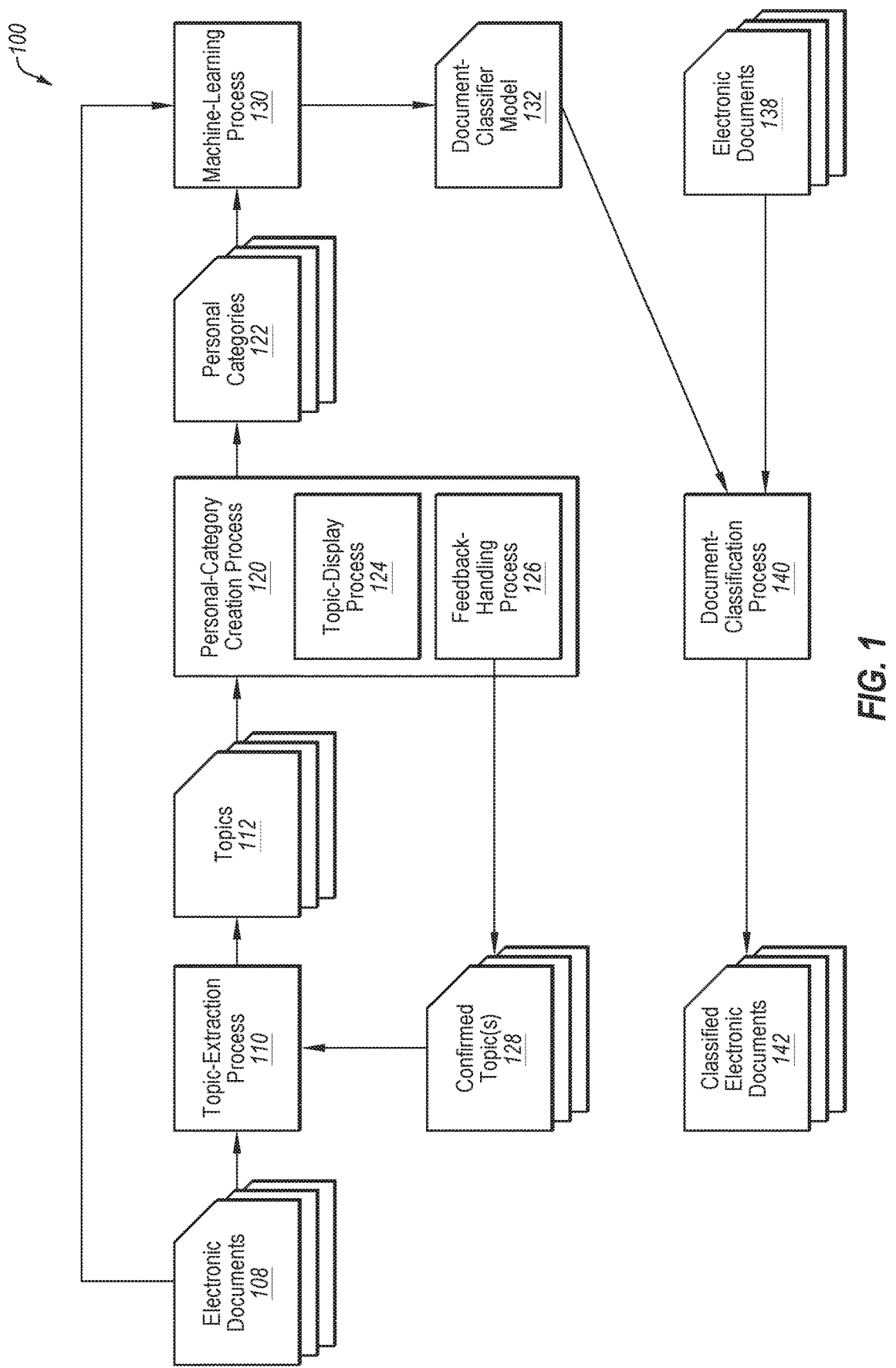
FIG. 1 is a block diagram of an example process for analyzing content of electronic documents.

The methods and systems described in the present disclosure are related to document classification according to the contents of the documents. Document classification may be used to facilitate identifying documents relevant to a particular purpose from a large number of electronic documents. For example, a user may search for electronic documents including the word "bug." Document classification may be used to distinguish between electronic documents relating to insects and electronic documents relating to software development.

As another example, document classification may be used to identify electronic documents to present to a user based on the user's identified interests. For example, if the user is interested in the economy of a particular country, but not that country's sports teams, document classification may be used to identify electronic documents from an international news feed that relate to the particular country's economy, but not the country's sports teams, for presentation to the user.

In some instances, document classification may be performed using predefined categories that are selected before classification of the documents. Predefined categories may be labor-intensive to generate. In some instances, identifying relevant categories may require an expert in the categories or the particular purpose of the classification. For example, identifying relevant categories may require judgement based on the particular purpose of the classification to determine whether there is a relevant difference between "generative models" and "discriminative models."

One reason that predefined categories may be labor intensive to generate is that the predefined categories may be different based on the collection of electronics documents that are being classified. For example, predefined categories for a collection of general news articles, for example, articles from "washingtonpost.com" may be different from predefined categories for a collection of scholarly articles relating to engineering, for example publications from the Institute of Electrical and Electronics Engineers.

Additionally, while a large number of predefined categories may increase the usefulness of classification, it may also increase the complexity of identifying the relevant categories. For example, identifying ten categories for classifying engineering publications may be simpler than identifying a thousand categories. But, classifying engineering publications according to a thousand categories may be more useful.

Methods and systems of the present disclosure may relate to classifying electronic documents without predefined categories related to the electronic documents. In some embodiments, a topic model may be used to discover topics within the electronic documents. The topic model may include an unsupervised or semi-supervised machine-learning model for automatically discovering topics contained in electronic documents.

In some embodiments, after discovering the topics, the discovered topics may be refined to generate personal categories. For example, refining the identified topics may H include combining similar topics, removing topics, and/or adding new topics. As a result, each of the electronic documents may be associated with at least one of the personal categories. An electronic document may be associated with a personal category based on the personal category describing a subject, a theme, a keynote, an issue, and/or a point of the content of the electronic document. As another result, the personal categories may include topics that are relevant to the particular purpose of the classification and exclude topics that may be determined to be redundant or irrelevant to the particular purpose of the classification. In the present disclosure, the term "personal categories" may refer to categories relevant to the particular customized purpose of the classification; as such, the term "personal categories" may, but need not refer to a person.

In some embodiments a user may provide feedback relative to the identified topics and/or the personal categories, which may be referred to in this disclosure as topic feedback. In these and other embodiments, the topic feedback may be used to update the refined topics and/or the topic model.

In some embodiments, after obtaining the personal categories and their associated electronic documents as training data, a document-classifier model may be trained by applying machine learning to the electronic documents and the personal categories. The document-classifier model may be used to classify other electronic documents according to the personal categories. The classified electronic documents may be presented to a user based on the classification of the electronic documents.

In some embodiments, the user may provide feedback relative to the classified electronic documents and/or the classification of the other electronic document, which may be referred to in this disclosure as document feedback. In these or other embodiments, the document feedback may be used to update the personal categories, the topic model, and/or the document-classification model.

The methods and systems of the present disclosure may relate to an improvement in computer-related technology because the methods and systems of the present disclosure may allow a computer to classify electronic documents without predefined categories (or taxonomy) for classifying the electronic documents. Previous systems for classification of electronic documents used predefined categories. Additionally, the present disclosure may relate to an improvement in computer-related technology because the methods and systems of the present disclosure may allow a computer to incrementally obtain categories by mapping topics into categories and comparing topics and merging similar topics. Additionally, the methods and systems of the present disclosure may relate to an improvement in the functioning of the computer itself because the methods and systems of the present disclosure may enable a computer to more efficiently and effectively refine topics to generate categories which may improve the classification of documents into the categories. For example, some of the methods and systems of the present disclosure may be configured to use topics as an input, which may or may not be predefined, and compare the topics. Similar topics may be combined. The result of the combining may be personal categories that may be more relevant to the particular purpose of the classification. Thus, the classification based on the personal categories may produce results that are more relevant to the particular purpose of the classification.

FIG. 1 is a block diagram of an example process 100 for analyzing content of electronic documents according to at least one embodiment described in this disclosure. In some embodiments, the process 100 may include a topic-extraction process 110, a personal-category creation process 120, a machine-learning process 130, and a document-classification process 140. In general, the process 100 may be used to identify topics 112 of electronic documents 108, refine the topics 112 to create personal categories 122, and classify electronic documents 138 according to the personal categories 122.

In some embodiments, the process 100 may include obtaining electronic documents 108. The electronic documents 108 may include text, image, graphs, figures, diagrams, among other document items. Alternatively or additionally, the electronic documents 108 may be in any suitable format for example, ".txt," ".doc," ".pdf," and ".html," among others. The electronic documents 108 may be from any source, for example, news articles, magazine articles, journal articles, scholarly articles, electronic books, and web pages, among other sources.

In general, the topic-extraction process 110 may be configured determine the topics 112 to which the electronic documents 108 are directed. Additionally or alternatively, the topic-extraction process 110 may be configured to associate the electronic documents 108 with the topics 112. In some embodiments, the topic-extraction process 110 may be performed using a machine-learning model. As an example, the machine-learning model may include a topic-extraction model, which may be referred to in the art as a "topic model."

In these and other embodiments, the electronic documents 108 may be analyzed during the topic-extraction process 110. Based on the analysis of the electronic documents 108, a subject, a theme, a keynote, an issue, and/or a point of the content of the electronic documents 108 may be determined. For example, the subject, theme, keynote, issue, and/or point of the content of the electronic documents 108 may be determined based on terms included in the electronic documents 108. Based on the subject, theme, keynote, issue, and/or point of the content of the electronic documents 108, the topics 112 may be determined. As a result, the topics 112 may describe subjects to which the electronic documents 108 are directed.

The topics 112 may include or relate to any number of subjects based on the subjects of the electronic documents 108. Additionally or alternatively, the topics 112 may be based on an indication of a desired number of topics. For example, a user may indicate a desired number of topics. The topic-extraction process 110 may be configured to generate the topics 112 such that the topics 112 include a number of topics equal to the desired number of topics. Additionally or alternatively, the desired number of topics may be automatically determined based on a quality metric.

In some embodiments, each of the topics 112 may be associated with one or multiple electronic documents 108. For example, one of the topics 112 may be associated with the electronic documents 108 that have a probability of including or portions that include a subject, a theme, a keynote, an issue, and/or a point of the content that is associated with the one of the topics 112. Alternatively or additionally, each of the electronic documents 108 may be associated with one or more topics 112. For example, one of the electronic documents 108 may be associated with multiple of the topics 112. In some embodiments some of the electronic documents 108 may not be associated with any of the topics 112. For example, if the electronic documents 108 includes one electronic document that doesn't have a threshold degree of commonality with any of the other electronic documents, the one electronic document may not be associated with any of the topics 112. Additionally or alternatively, the one electronic document may be associated with a miscellaneous topic.

In some embodiments a commonality between the electronic documents 108 associated with a particular topic 112 may be that the electronic documents 108 associated with a particular topic 112 may be associated with one or more of the same terms. The word "term" as used in the present disclosure may include one or more single words or multiple words, for example, phrases or bigrams.

In some embodiments, the topics 112 may include a pertinence score and/or pertinence rank for one or more electronic documents 108 associated therewith. Each of the electronic documents 108 may have a pertinence score and/or pertinence rank for each of the topics 112 to which the electronic documents 108 are associated. In these and other embodiments, a pertinence score and/or a pertinence rank may indicate a degree to which a first electronic document pertains to the subject described by a first topic. Thus, an electronic document with a higher pertinence score and/or pertinence rank may have a higher probability of pertaining to the subject described in its associated topic. Additionally or alternatively, the pertinence score and/or pertinence rank of a particular electronic document 108 may reflect a percentage to which the particular electronic document is associated with one or more topics 112. For example, the particular electronic document 108 may be sixty percent associated with a first topic, and forty percent associated with a second topic.

In some embodiments, the topic-extraction process 110 of FIG. 1 may generate the pertinence scores and/or pertinence ranks for the electronic documents 108 for the topics 112. The pertinence scores and/or pertinence ranks may be based on occurrences of terms in the electronic documents 108.

In some embodiments, the process 100 may include the personal-category creation process 120. In general, the personal-category creation process 120 may be configured to H refine the topics 112 to generate the personal categories 122. The personal-category creation process 120 may be configured to refine the topics 112 by removing topics, combining topics, and/or adding new topics. In some embodiments, the personal-category creation process 120 may also be configured to refine the topics 112 by designating personal categories 122 as "relevant" or "irrelevant," to the particular purpose of the classification.

In some embodiments, the personal-category creation process 120 may include removing one or more topics 112 that may be redundant or otherwise unnecessary for the particular purpose of the classification. Additionally or alternatively, the personal-category creation process 120 may include adding a new topic that may be relevant to the particular purpose of the classification. Additionally or alternatively, the personal-category creation process 120 may include combining two or more topics 112 into a single topic 112. Additionally or alternatively, the personal-category creation process 120 may include changing the associations between one or more topics 112 and one or more terms. Additionally or alternatively, the personal-category creation process 120 may include changing the associations between one or more topics 112 and one or more electronic documents 108. Additionally or alternatively, the personal-category creation process 120 may include designating one or more topics as "relevant" or "irrelevant." Whether the topics are designated as "relevant" or "irrelevant" may relate to the particular purpose of the classification and/or the interest of a particular user. For example, a particular topic of "Economy of the France" may be designated as "relevant" while another topic of "France World Cup" may be designated as "irrelevant" based on the particular purpose of the classification being related to global markets. The personal categories 122 may reflect all of the additions, subtractions, and/or combinations of the personal-category creation process 120.

In some embodiments, the personal-category creation process 120 may include the topic-display process 124 which may be configured to display one or more of the topics 112. The topic-display process 124 may be configured to display a particular topic 112, one or more terms associated with the particular topic 112, and/or part or all of one or more electronic documents 108 associated with the particular topic 112. The topics 112 may be displayed on a graphical user interface (GUI), for example.

In some embodiments, the personal-category creation process 120 may include the feedback-handling process 126 which may be configured to obtain topic feedback relative to the topics 112. The feedback-handling process 126 may be configured to use a GUI. In some embodiments, the GUI used in the feedback-handling process 126 may also be used during the topic-display process 124. For example, one or more of the topics 112 may be displayed by the topic-display process 124 on the GUI. A user may provide topic feedback relative to the topics 112 displayed on the GUI. The feedback-handling process 126 may receive and handle the topic feedback.

In some embodiments, the feedback-handling process 126 may generate confirmed topics 128 based on the topic feedback. The feedback-handling process 126 may provide the confirmed topics 128 to the topic-extraction process 110. The topic-extraction process 110 may be configured to use the confirmed topics 128 to update the topics 112. For example, the topics 112 may be provided for presentation on the topic-display process 124. A confirmation of the topics 112 may be received by the feedback-handling process 126, for example, from a user viewing the topic-display process 124. The feedback-handling process 126 may generate the confirmed topics 128. The confirmed topics 128 may be provided to the topic-extraction process 110 which may be configured to update the topics 112, and/or the topic-extraction model, either or both of which may be stored for future use. For example, the topic-extraction process 110 may use existing topics, for example, the topics 112 and/or the confirmed topics 128 to update the topic-extraction model. Thereafter, in a subsequent iteration of the process 100, the updated topic-extraction model may be used to obtain additional topics 112.

The confirmed topics 128 may include any changes made to the topics 112 during or associated with the personal-category creation process 120. Additionally or alternatively, the confirmed topics 128 may include the personal categories 122 and/or any differences between the topics 112 and the personal categories 122. For example, the confirmed topics 128 may include confirmations of one or more of the topics 112. The confirmed topics 128 may include designations of one or more of the topics 112 as "relevant" or "irrelevant." Additionally or alternatively, the confirmed topics 128 may include rejections of one or more topics 112, which may be based on the one or more topics 112 being redundant or unnecessary in view of another of the topics 112. Additionally or alternatively the confirmed topics 128 may include indications that one or more terms associated with a particular topic 112 should be associated with another topic 112, or disassociated from the particular topic 112. Likewise, the personal categories 122 may reflect changes in associations between terms and the personal categories 122.

Additionally or alternatively the confirmed topics 128 may include indications that one or more electronic documents 108 associated with a particular topic 112 and/or term should be associated with another topic 112 and/or term or disassociated from the particular topic 112 and/or term.

As an example of the operation of the personal-category creation process 120, the topic-display process 124 may display a particular topic 112. The topic-display process 124 may additionally display one or more terms associated with the particular topic 112 and/or one or more electronic documents 108 associated with the particular topic 112. A user may indicate that the particular topic 112 is relevant to the user. The personal-category creation process 120 may designate the particular topic 112 as "relevant" in the personal categories 122. Additionally or alternatively, the indication may be received by the feedback-handling process 126, which may be configured to include the designation as "relevant" in the confirmed topics 128. The feedback-handling process 126 may be configured to provide the confirmed topics 128 to the topic-extraction process 110. The topic-extraction process 110 may be configured to update the topics 112 based on the confirmed topics 128. Thus, the topic-extraction process 110 may be configured to designate the particular topic as "relevant."

As another example, the user may indicate that two topics should be combined. For example, the user may indicate that a topic of "artificial intelligence" and a topic of "pattern recognition" should be combined. The user may determine that topics should be combined based on the particular purpose of the classification. The combination of the two topics may include associating all of the terms and/or electronic documents 108 from a particular topic 112 with the other topic 112. Additionally or alternatively, after the association of all of the terms and/or electronic documents 108 from the particular topic 112 to the other topic 112, the particular topic may be removed from the topics 112, and/or the personal categories 122. The removal of the particular topic may be based on the particular topic being redundant in view of the other topic which includes all of the terms and/or electronic documents 108 previously associated with the particular topic. As another example, the topic-display process 124 may display a particular topic 112 and terms associated with the particular topic 112. A user may indicate that one or more of the terms associated with the particular topic 112 may be associated with a new topic not previously included in the topics 112. A new topic may be created to be included in the personal categories 122, and/or the confirmed topics 128 based on the selection of terms from existing topics 112 and associating the selected terms with a new topic. As another example, the topic-display process 124 may display two topics 112 and terms associated with the two topics 112. A user may indicate that one term from each of the two topics 112 may be associated with a new topic. Additionally or alternatively, new terms may be input. The inputted terms may be associated with an existing topic 112 or a new topic to be included in the personal categories 122 and/or the confirmed topics 128.

As another example, the topic-display process 124 may display a particular topic 112 and terms associated with the particular topic 112. A user may indicate that one or more of the terms may not be associated with the particular topic 112, or that the terms may be associated with another topic instead of the particular topic 112. Additionally or alternatively, the user may indicate that a particular electronic document 108 may not be associated with a particular term, and/or a particular topic.

Figure 2:
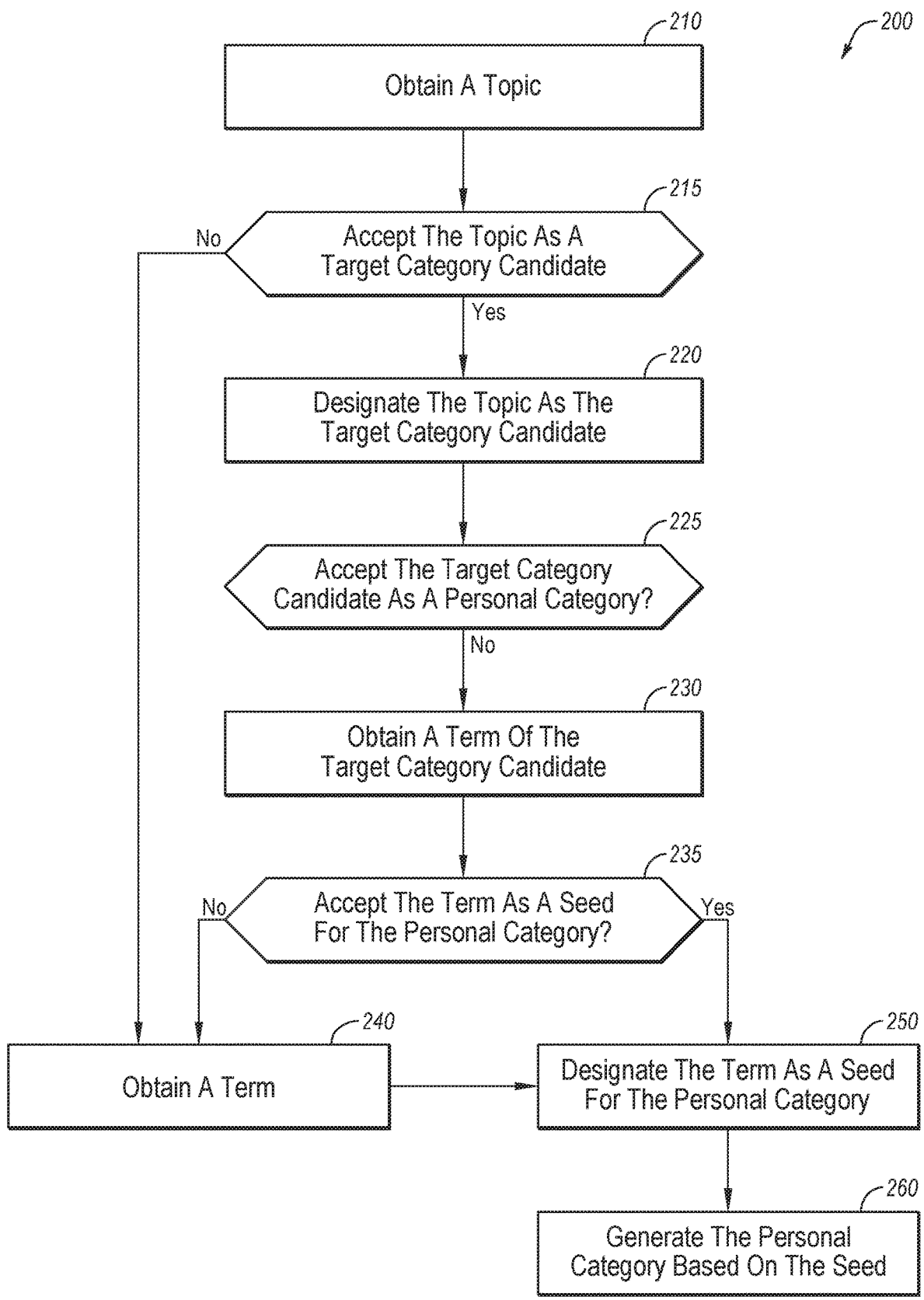
FIG. 2 is a flow chart of an example process for creating a personal category.

An example of operations that may be included in the personal-category selection process 120 are included in FIG. 2. FIG. 2 is a flow chart of an example process 200 for creating a personal category according to at least one embodiment described in this disclosure. One or more of the operations of the process 200 may be performed by the personal-category creation process 120, the topic-display process 124, and the feedback-handling process 126 of FIG. 1. The operations of process 200 may be used to generate the personal categories 122 and/or the confirmed topics 128 of FIG. 1. Although illustrated with discrete blocks, the steps and operations associated with one or more of the blocks of the process 200 may be divided into additional blocks, combined into fewer blocks, or eliminated, depending on the desired implementation.

The process 200 may begin at block 210. At the block 210, a topic may be obtained. The topic may be obtained, for example from a topic-extraction process. One of the topics 112 of FIG. 1 may be an example of the topic obtained at the block 210.

At block 215, a determination may be made regarding whether to accept the topic as a target category candidate. For example, the topic may be presented to a user. The user may input an indication regarding whether to accept the topic as a target category candidate or not. The user may determine whether to accept the topic as a target category candidate based on the particular purpose of the categorization.

If the topic is accepted as a target category candidate at the block 215, the process 200 may proceed to block 220. At the block 220, the topic may be designated as the target category candidate.

At block 225, a determination may be made regarding whether to accept the target category candidate as a personal category. For example, the target category candidate may be presented to a user. The user may input an indication regarding whether to accept the target category candidate as a personal category. The user may determine whether to accept the target category candidate as a personal category based on the particular purpose of the categorization. The determination of whether to accept the target category candidate as a personal category may include an approval of the target category candidate as it is. An indication not to accept the target category candidate as a personal category may be an indication or instruction to refine or adjust the target category candidate. For example, the user may be prompted with a question regarding whether the user wants to refine the target category candidate. If the user wants to refine the target category candidate, the user has not accepted the target category candidate. One of the personal categories 122 of FIG. 1 may be an example of a target category candidate that has been accepted as a personal category.

If the target category candidate is not accepted as a personal category at the block 225, the process 200 may continue to block 230. At the block 230, a term of the target category candidate may be obtained. The term may be associated with the target category candidate. For example, the term may be selected from a number of terms that are associated with the target category candidate.

At block 235, a determination may be made regarding whether to accept the term as a seed for a personal category. For example, the term may be presented to a user. The user may input an indication regarding whether to accept the term as a seed for a personal category. The user may determine whether to accept the term as a seed for a personal category based on the particular purpose of the categorization.

If the term is not accepted as a seed for a personal category at the block 235, the process 200 may continue to block 240. Additionally, if the topic was not accepted as a target category candidate at the block 215, the process may continue to the block 240. At the block 240, a term may be obtained. The term may be obtained from a user. To arrive at the block 240 the user may have not accepted the topic as a target category candidate at the block 215, or the user may have not accepted the term as a seed for a personal category at the block 235. The user, having not accepted the topic of block 210, and not accepted the term of block 230, may be prompted to provide a term. In some embodiments, the user may be provided with one or more terms that may be associated with the target category candidate or another topic. The user may select a term that has been presented or input a term.

The process 200 may continue from the block 240 to block 250. Also, if the term is accepted at the block 235, the process may continue to the block 250. At the block 250, the term input may be designated as a seed for a personal category. The term designated as the seed for a personal category may be either the term accepted at the block 235 or the term obtained at the block 240.

At the block 260, a personal category may be generated from the seed. One of the personal categories 122 of FIG. 1 may be an example of a personal category generated based on the seed.

In some embodiments, the personal category may be based on any number of seeds. For example, more than one term may be obtained from either or both of the block 230 and the block 240. Further, the personal category may be adjusted by adding or subtracting terms.

Returning to FIG. 1, the personal-category creation process 120 may further include steps that may relate to refining the topics 112. For example, the personal-category creation process 120 may be configured to compare two or more topics 112 to determine a similarity between the two or more topics 112. The similarity between the two or more topics 112 may be used to combine the two or more topics 112. For example, the personal-category creation process 120 may be configured to compare a first topic with a second topic to determine a similarity between the first topic and the second topic. The personal-category creation process 120 may be configured to associate one or more electronic documents and/or terms associated with the first topic with the second topic. Additionally, the personal-category creation process 120 may be configured to disassociate the one or more electronic documents and/or terms from the first topic. Additionally or alternatively the personal-category creation process 120 may be configured to remove the first topic from the personal categories 122. As an example of how the personal-category creation process 120 may compare two or more topics 112, the personal-category creation process 120 may perform a method 300 as illustrated in FIG. 3.

Figure 3:
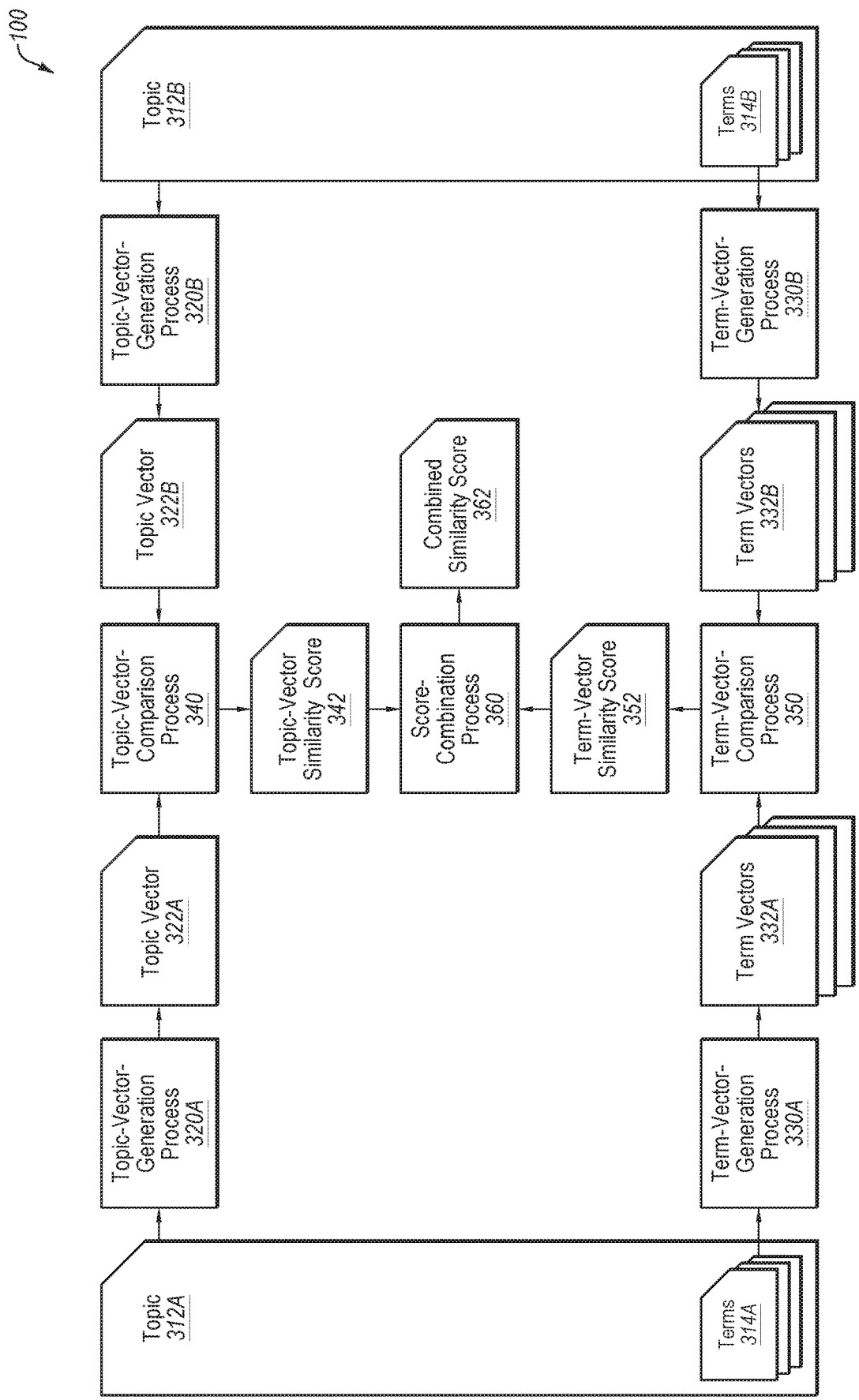
FIG. 3 is a block diagram of an example process for determining a similarity between two topics.

FIG. 3 is a block diagram of an example process 300 for determining a similarity between two topics according to at least one embodiment described in this disclosure. In some embodiments, the process 300 may include a topic-vector-generation process 320, a topic-vector-comparison process 340, a term-vector-generation process 330, a term-vector-comparison process 350, and a score-combination process 360. In general, the process 300 may be configured to compare two or more topics 312 to generate a combined similarity score 362 based on a similarity between the two or more topics 312. The topics 312 of FIG. 3 may be the same as, or similar to, the topics 112 of FIG. 1 and/or the topics 212 of FIG. 2. The terms 314 of FIG. 3 may be the same as, or similar to, the terms 214 of FIG. 2.

Two topics are illustrated in FIG. 3: a first topic 312A and a second topic 312B, (collectively referred to as the topics 312 and/or individually referred to as the topic 312). Two topic-vector generation processes 320 are also illustrated in FIG. 3: a first topic-vector-generation process 320A and a second topic-vector-generation process 320B, (collectively referred to as the topic-vector-generation processes 320 and/or individually referred to as the topic-vector-generation process 320). Two topic vectors 322 are illustrated in FIG. 3: a first topic vector 322A and a second topic vector 322B, (collectively referred to as the topic vectors 322 and/or individually referred to as the topic vector 322). Two groups of terms are illustrate in FIG. 3: first terms 314A and second terms 314B, (collectively referred to as the terms 314 and/or individually referred to as the term 314). Two term-vector-generation processes 330 are illustrated in FIG. 3: a first term-vector-generation process 330A and a second term-vector-generation process 330B, (collectively referred to as the term-vector-generation processes 330 and/or individually referred to as the term-vector-generation process 330). Two groups of term vectors 332 are illustrated in FIG. 3: first term vectors 332A and second term vectors 332B, (collectively referred to as the term vectors 332 and/or individually referred to as the term vector 332). The illustration of the topic-vector generation-processes 320 and the term-vector-generation processes 330 as separate blocks is for illustration purposes only. The same topic-vector-generation process 320 and/or topic-vector-generation process 320 may be used on any number of topics and/or terms to generate the topic vectors 322 and the term vectors 332, respectively.

The topic-vector-generation process 320 may be configured to generate the topic vectors 322 based on the topics 312. The topic vectors may be generated using any suitable means, for example a topic mode inference process. In some embodiments, the topic vectors 322 may include multidimensional vectors of numbers based on the topics 312. For example, the first topic vector 322A may include a multidimensional vector of numbers based on the first topic 312A. Likewise, the second topic vector 322B may be based on the second topic 312B. The topic vectors 322 may include a keyword-topic distribution. The topic vectors 322 may include one or more probabilities that one or more terms may be associated with the topic. In some embodiments, the topic vectors 322 may include ten-thousand or more dimensions. The topic vectors 322 may be based on terms associated with the topics 312. Additionally or alternatively, the topic vectors 322 may be based on electronic documents associated with the topics 312.

The topic-vector-comparison process 340 may be configured to compare two or more topic vectors 322 to generate a topic-vector similarity score 342. The topic-vector-comparison process 340 may include a mathematical comparison of the two or more topic vectors 322 to determine a similarity between the two or more topic vectors 322. The result of the comparison may be a numerical result. The numerical result may be included in the topic-vector similarity score 342. The topic-vector similarity score 342 may represent a similarity between the two or more topic vectors 322. The topic-vector similarity score 342 may be scaled or averaged to include a single number or a multi-dimensional vector of numbers.

The term-vector-generation process 330 may be configured to generate the term vectors 332 based on one or more terms 314 of the topics 312. There may be a term vector 332 for each of the terms 314 associated with the topics 312. As such, because a particular topic may be associated with more than one term, the particular topic, for example, the first topic 312A may be associated with more than one first term vector 332A.

In some embodiments, the term vectors 332 may include a multidimensional vectors of numbers based on one or more of the terms 314 of the topics 312. For example, the first term vectors 332A may include a multidimensional vector of numbers based on one or more of the first terms 314A of the first topic 312A. Likewise, the second term vectors 332B may be based on one or more second terms 314B of the second topic 312B. In some embodiments, the term vectors 332 may include word-embedding vectors. The term vectors 332 may be generated through language modeling or feature learning techniques. In some embodiments, the term vectors 332 may be pre-trained word-embedding vectors. Additionally or alternatively, the term vectors 332 may include domain-specific word-embedding vectors. For example, the term vectors 332 may be generated from data related to the source of the electronic documents, and/or the particular purpose of the classification. In some embodiments, each of the term vectors 332 may include one-hundred or more dimensions. The term vectors 332 may be based on electronic documents associated with the terms 314.

The term-vector-comparison process 350 may be configured to compare two or more term vectors 332 to generate a term-vector similarity score 352. For example, the term-vector-comparison process 350 may be configured to compare two or more first term vectors 332A associated with the first topic 312A with two or more second term vectors 332B associated with the second topic 312B. The term-vector-comparison process 350 may include a mathematical comparison of the two or more term vectors 332 to determine a similarity between the two or more term vectors 332. The result of the mathematical comparison may be a numerical result. The numerical result may be included in the term-vector similarity score 352. The term-vector similarity score 352 may represent a similarity between the two or more term vectors 332. The term-vector similarity score 352 may be scaled or averaged to include a single number or a multi-dimensional vector of numbers.

The score-combination process 360 may be configured to combine two or more similarity scores to generate the combined similarity score 362. For example, the score-combination process 360 may be configured to combine the topic-vector similarity score 342 and the term-vector similarity score 352 to generate the combined similarity score 362. As another example, the score-combination process 360 may be configured to combine two or more term-vector similarity scores 352 based on the output of the term-vector-comparison process 350 of two or more first term vectors 332A with two or more second term vectors 332B.

In some embodiments, the score-combination process 360 may perform mathematical operations on the topic-vector similarity score 342 and/or the term-vector similarity score 352 to generate the combined similarity score 362. For example, the score-combination process 360 may be configured to perform an average, and/or weighted average. Additionally or alternatively, the score-combination process 360 may be configured to perform vector math or linear algebra to generate the combined similarity score 362.

Modifications, additions, or omissions may be made to the process 300 without departing from the scope of the present disclosure. For example, in some embodiments, the topic-vector-generation process 320 and the topic-vector-comparison process 340 may be omitted. In these or other embodiments, the topic-vector similarity score 342 may be omitted from the process 300 or based on another comparison. In these or other embodiments, the combined similarity score 362 may be based on the term-vector similarity score 352. As another example, the term-vector-generation process 330 and the term-vector-comparison process 350 may be omitted from the process 300. In these or other embodiments, the term-vector similarity score 352 may be omitted from the process 300 or based on another comparison. In these or other embodiments, the combined similarity score 362 may be based on the topic-vector similarity score 342. Further, the order of operations may vary according to different implementations.

Returning now to FIG. 1, in some embodiments, the personal-category creation process 120 may combine two topics based on a determined similarity between the two topics. The combined similarity score 362 of FIG. 3 may be an indication of the similarity between the two topics. For example, two topics may be determined to be similar when the combined similarity score 362 of the two topics exceeds a threshold. Additionally or alternatively, the two topics may be determine to be similar when the topic-vector similarity score 342 of the two topics and/or the term-vector similarity score 352 of the two topics exceeds a threshold. In some embodiments, there may be independent thresholds and criteria for each of the topic-vector similarity score 342, the term-vector similarity score 352, and the combined similarity score 362. For example, the two topics may be determined to be similar if the term-vector similarity score 352 exceeds a first threshold, but only if the topic-vector similarity score 342 also exceeds a second threshold. Any or all of the above-mentioned thresholds may be selected or input by a user, or generated by machine learning.

In some embodiments, the personal-category creation process 120 may generate the personal categories 122. The personal categories 122 may be the same as, or substantially similar to the topics 112 described above. However, the personal categories 122 may, as a result of the personal-category creation process 120, be more relevant to the particular purpose of the classification than the topics 112. Additionally or alternatively, the personal categories 122 may include fewer redundant topics. The personal categories 122 may reflect any additions, subtractions, and/or combinations of the topics 112 made during the personal-category creation process 120. As described above, with regard to the topics 112, the personal categories 122 may include a pertinence score and/or pertinence rank such that each electronic documents 108 associated with each personal categories 122 may include a pertinence score and/or pertinence rank indicating a degree to which the electronic documents 108 pertains to the subject described by the personal categories 122.

In some embodiments, the machine-learning process 130 may be configured to generate a document-classifier model 132 based on the personal categories 122. The machine-learning process 130 may be configured to build the document-classifier model 132 by applying machine learning to the electronic documents 108 to "learn" characteristics of electronic documents 108 associated with each of the personal categories 122. The machine-learning process 130 may use the electronic documents 108 and their associated personal categories 122 as training data to train the document-classifier model 132. The machine-learning process 130 may be configured to use any suitable machine-learning method to generate the document-classifier model 132, for example, a support vector machine, or a logistic regression, among others.

In some embodiments, the machine-learning process 130 may use a subset of the electronic documents 108 and their associated refined topic 122 as training data to generate the document-classifier model 132. The subset of the electronic documents 108 that may be used as training data may be based on the personal categories 122. For example, for each of the personal categories 122, a subset of the electronic documents 108 with the highest pertinence scores may be included in the training data for the machine-learning process 130. For example, if the personal categories 122 included ten topics and fifteen hundred electronic documents 108, the one hundred electronic documents 108 from each of the personal categories 122 with the highest pertinence scores may be used as training data for the generation of the document-classifier model 132. Thus, some of the electronic documents 108 may not be used to generate the document-classifier model 132. Alternatively or additionally, one or more of the electronic documents 108 may be ranked in the top one hundred documents in pertinence score for two or more of the ten personal categories 122. In these and other embodiments, the one or more of the electronic documents 108 may be used multiple times to generate the document-classifier model 132. As another example, for each of the personal categories 122, a subset of the electronic documents 108 with pertinence scores and/or pertinence ranks that exceed a threshold may be included in the training data for the machine-learning process 130. The threshold may be selected by a user or by a machine learning process.

The document-classification process 140 may be configured to classify electronic documents 138 using the document-classifier model 132. For example, the document-classification process 140 may be configured to classify the electronic documents 138 into the personal categories 122 according to the one or more characteristics "learned" in the generation of the document-classifier model 132.

In some embodiments, the electronic documents 138 may be electronic documents as described above with regard to electronic documents 108. However, the electronic documents 138 may or may not be the same as the electronic documents 108. In some embodiments, the electronic documents 138 may include one or more electronic documents that were included in the electronic documents 108. In these or other embodiments, the electronic documents 138 may include electronic documents that were not included in the electronic documents 108. For example, the electronic documents 138 may include one or more newly published electronic documents.

In some embodiments, the document-classification process 140 may be configured to generate the classified electronic documents 142. The classified electronic documents 142 may include the electronic documents 138 after the electronic documents 138 are classified by the document-classification process 140. For example, the classified electronic documents 142 may be organized, tagged, labeled, or otherwise made to include an indication of a topic or subject to which the classified electronic documents 142 is likely to pertain. For example, the document-classification process 140 may be configured to classify each electronic document of the electronic documents 138 into one or more subjects described by the personal categories 122 using the document-classifier model 132.

Modifications, additions, or omissions may be made to the process 100 without departing from the scope of the present disclosure. For example, in some embodiments the electronic documents 138 and the classified electronic documents 142 may include only a single electronic document. As another example, the feedback-handling process 126 and/or the confirmed topics 128 may be omitted. Further, the order of operations may vary according to different implementations.

Figure 4:
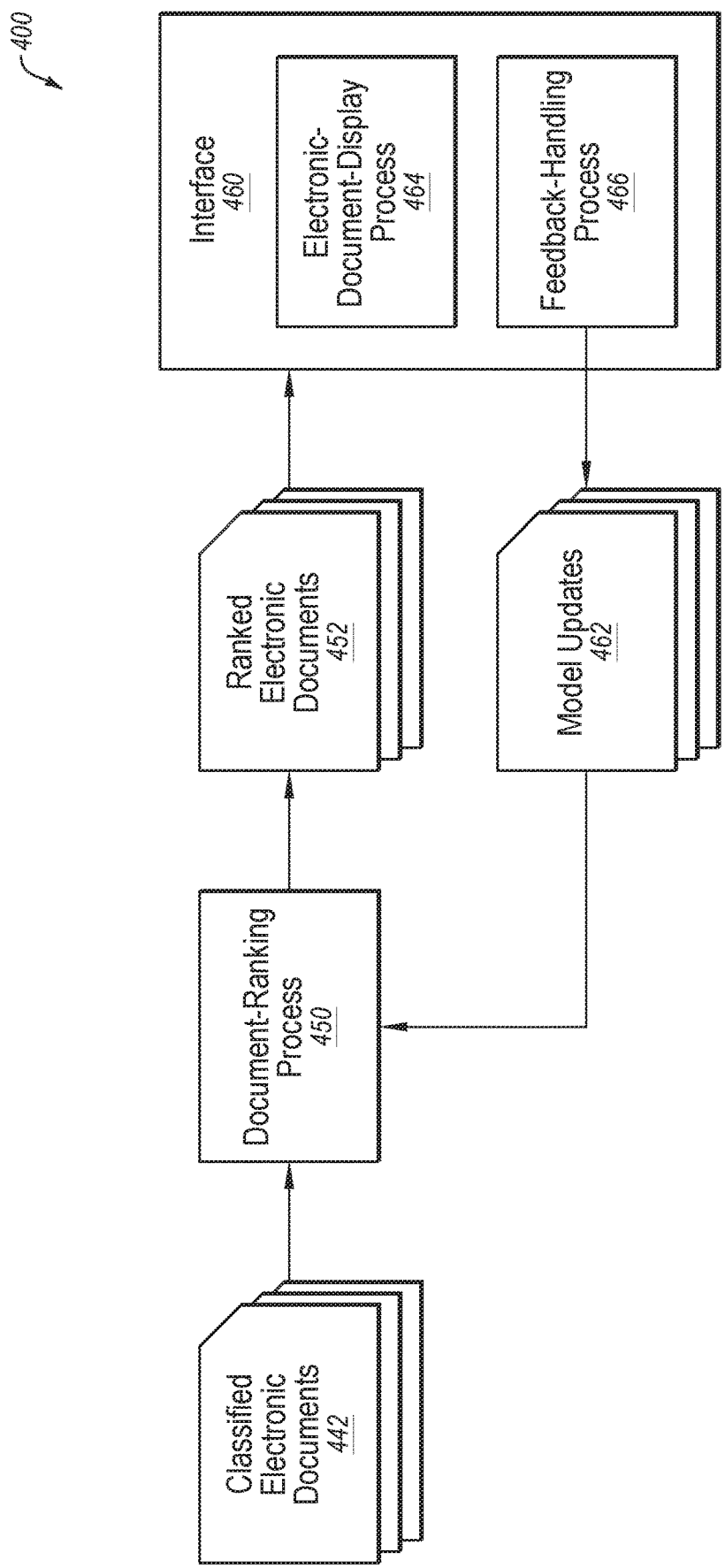
FIG. 4 is a block diagram of an example process for displaying electronic documents according to the content of the electronic documents.

FIG. 4 is a block diagram of an example process 400 for displaying electronic documents according to the content of the electronic documents, according to at least one embodiment described in this disclosure. The process 400 may include a document-ranking process 450, an electronic-document-display process 464, and a feedback-handling process 466. In general, the process 400 may be configured to ranked classified electronic documents 442 and display the ranked electronic documents 452.

The process 400 may include obtaining the classified electronic documents 442. The classified electronic documents 442 may be the same as, or similar to the classified electronic documents 142 of FIG. 1.

The document-ranking process 450 may be configured to score or rank the classified electronic documents 442 to generate the ranked electronic documents 452. The document-ranking process 450 may be configured to score or rank the classified electronic documents 442 according to a probability that a user may be interested in the classified electronic documents 442. Additionally or alternatively, the document-ranking process 450 may be configured to score or rank the classified electronic documents 442 according to a probability that the classified electronic documents 442 are relevant to the particular purpose of the classification.

In these and other embodiments, the document-ranking process 450 may store information about the user, the user's interests, and/or the particular purpose of the classification. For example, the document-ranking process 450 may store information about electronic documents selected and/or read by the user. Additionally or alternatively, the document-ranking process 450 may store information about topics selected by the user. Additionally or alternatively, the document-ranking process 450 may store information about documents designated as "relevant" or "irrelevant." For example, the user may select topics of relevance to the particular purpose of the classification during or associated with the personal-category creation process 120 of FIG. 1. In some embodiments, the document-ranking process 450 may use the information stored about the user, the user's interests, and/or the particular purpose of the classification to score or rank the classified electronic documents 442 according to a probability that the user may be interested in the classified electronic documents 442 or that the classified electronic documents are relevant to the particular purpose of the classification.

Additionally or alternatively, the ranking of the ranked electronic documents 452 may be based on the certainty of the classification of the classified electronic documents 442. For example, the classified electronic documents 442 may include an indication of the certainty of the classification of the classified electronic documents 442. The classified electronic documents 442 with a higher degree of certainty in their classification may receive higher scores or ranks.

Additionally or alternatively the document-ranking process 450 may filter the classified electronic documents 442 to remove one or more of the classified electronic documents 442 from the ranked electronic documents 452 such that the removed electronic documents are not displayed. For example, as described above, a user may indicate that a particular topic is "irrelevant" during or associated with the personal-category creation process 120 of FIG. 1. The document-ranking process 450 may remove the classified electronic documents 442 associated with the particular topic from the ranked electronic documents 452 such that the classified electronic documents 442 associated with the particular topic are not displayed.

The ranked electronic documents 452 may include one or more of the classified electronic documents 442, and one or more scores and/or ranks associated with the ranked electronic documents 452. In some embodiments, the ranked electronic documents 452 may include all of the electronic documents of the classified electronic documents 442. Alternatively or additionally, the ranked electronic documents 452 may exclude one or more of the classified electronic documents 442. The excluded classified electronic documents 442 may be excluded based on an indication that a particular topic is irrelevant.

In some embodiments, the electronic-document-display process 464 may be configure to display the ranked electronic documents 452. For example, the electronic-document-display process 464 may be configured to initially display a title or abstract of one or more of the ranked electronic documents 452. In these and other embodiments, the electronic-document-display process 464 may be configured to display the full text of a particular electronic document of the ranked electronic documents 452 if the user selects the title of the particular electronic document.

In some embodiments, the electronic-document-display process 464 may be displayed on an interface 460, for example, a GUI. The electronic-document-display process 464 may be configured to display the ranked electronic documents 452 in order according to score and/or rank.

Additionally or alternatively, the electronic-document-display process 464 may be configured to display the ranked electronic documents 452 in groupings, for example, according to topic. In some embodiments, the electronic-document-display process 464 may be configured to display a particular number of electronic documents for each topic of a set of topics. For example, the electronic-document-display process 464 may display the top scoring three documents in each of four topics. In some embodiments, the electronic-document-display process 464 may be configured to display electronic documents associated with topics designated as "relevant" before electronic documents not associated with a topic designated as relevant.

In some embodiments, the feedback-handling process 466 may be configured to obtain document feedback regarding one or more of the displayed ranked electronic documents 452. The electronic-document-display process 464 may be configured to use the interface 460. In some embodiments, the document feedback may include the user selecting a particular electronic document of the displayed ranked electronic documents 452 to be displayed. Additionally or alternatively, the document feedback may include an indication from the user that a particular electronic document is "relevant" or "irrelevant." Additionally or alternatively, the document feedback may include an indication from the user that a particular electronic document does not pertain to a particular topic.

In some embodiments, the feedback-handling process 466 may be configured to obtain topic feedback regarding the topics of one or more of the displayed ranked electronic documents 452. The topic feedback may include a user selecting electronic documents that are associated with a particular topic more often than the user selecting electronic documents that are associated with another topic. The topic feedback may include an indication that a topic is "relevant" or irrelevant." The topic feedback may also include an indication that a particular topic is more "relevant" than another topic.

In some embodiments, the feedback-handling process 466 may be configured to generate the model updates 462 based on the document feedback and/or the topic feedback. The model updates 462 may include the document feedback and/or the topic feedback. The model updates 462 may include an indication that a particular topic should be given priority in the document-ranking process 450. Alternatively or additionally, the model updates 462 may include an indication that a particular topic should be filtered out and not displayed.

In some embodiments, the model updates 462 may be provided to the document-ranking process 450. The document-ranking process 450 may update information about the user and/or the user's interests based on the model updates 462. Additionally or alternatively, the document-ranking process 450 may update information about what may be "relevant" to the particular purpose of the classification based on the model updates 462.

Additionally or alternatively, the model updates 462 may be provided to the topic-extraction process 110 of FIG. 1. The topic-extraction process 110 may be configured to update the topics 112 and/or the topic-extraction model, either or both of which may be stored and used for further iterations of the process 100, based on the model updates 462. For example, the topic-extraction process 110 may be configured to verify one or more topics 112 based on topic feedback included in the model updates 462. For example, if a user indicates that a particular electronic document is "relevant," the topic-extraction process 110 may be configured to prioritize one or more topics associated with the particular electronic document for future iterations of the process 100.

Additionally or alternatively, the model updates 462 may be provided to the machine-learning process 130 of FIG. 1. The machine-learning process 130 may be configured to update the document-classifier model 132, which may be stored and used for further iterations of the process 100, based on the model updates 462. For example, the machine-learning process 130 may be configured to include or exclude a particular electronic document as associated with a particular topic in the training data of the machine-learning process 130 based on document feedback included in the model updates 462. For example, if a user indicates that a particular electronic document is exemplary of a topic, the machine-learning process 130 may be configured to use the particular electronic document in the training of the document-classifier model 132.

Modifications, additions, or omissions may be made to the process 400 without departing from the scope of the present disclosure. For example, the document-ranking process 450 may be omitted. In these or other embodiments, each of the classified electronic documents 442 may be displayed without regard for ranking. As another example, the feedback-handling process 466 may be omitted. Further, the order of operations may vary according to different implementations.

Figure 5:
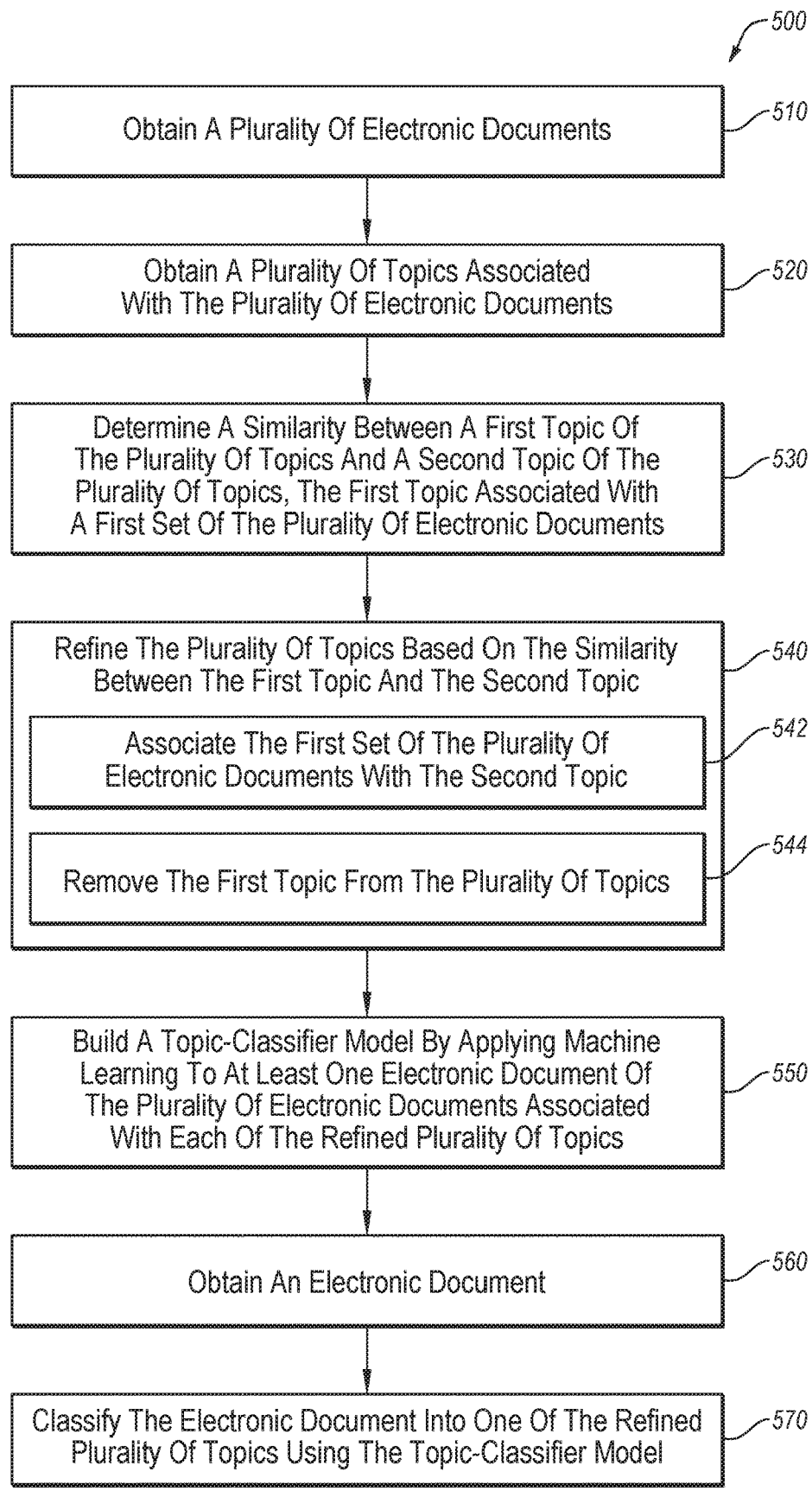
FIG. 5 is a flow chart of an example method for analyzing content of electronic documents.

FIG. 5 is a flow chart of an example method 500 configured to analyze content of electronic documents, according to at least one embodiment described in this disclosure The method 500 may be performed by any suitable system, apparatus, or device. For example, the computing system 600 of FIG. 6 may perform one or more of the operations associated with the method 500. Although illustrated with discrete blocks, the steps and operations associated with one or more of the blocks of the method 500 may be divided into additional blocks, combined into fewer blocks, or eliminated, depending on the desired implementation.

The method 500 may begin at block 510, where multiple electronic documents may be obtained. The electronic documents of block 510 may be the same as, or similar to, the electronic documents 108 of FIG. 1 and/or the electronic documents 208 of FIG. 2.

In block 520, multiple topics associated with the multiple electronic documents may be obtained. The multiple topics may be such that each topic is associated with at least one electronic document. Additionally or alternatively, the multiple topics may be such that each electronic document is associated with at least one topic. In block 520, the topics may be associated with the electronic documents. For example, a process the same as, or similar to, the topic-extraction process 110 of FIG. 1 may be configured to associate the multiple topics with the multiple electronic documents. The topics of block 520 may be the same as, or similar to, the topics 112 of FIG. 1 and/or the topics 212 of FIG. 2.

In some embodiments, the multiple topics may be obtained by analyzing the multiple electronic documents using a topic-extraction model through a process the same as, or similar to the topic-extraction process 110 of FIG. 1. Additionally or alternatively, the multiple electronic documents may be associated with the multiple topics by analyzing the multiple electronic documents using the topic-extraction model. In these and other embodiments, the multiple topics may not be provided to the topic extraction model, but may be generated based on the multiple electronic documents. Alternatively or additionally, the topics may be provided. In these and other embodiments, the topics that may be provided may be based on feedback from a user. As an example, the confirmed topics 128 of FIG. 1 and/or the model updates 462 of FIG. 4 may be topics that are provided.

In block 530, a similarity may be determined between a first topic of the multiple topics and a second topic of the multiple topics. The similarity may be determined through a process the same as, or similar to, the personal-category creation process 120 of FIG. 1, and/or the process 300 of FIG. 3. The first topic may be associated with a first set of electronic documents of the multiple electronic documents. In some embodiments, determining the similarity between the first topic and the second topic may include obtaining a first term vector of numbers representing a first term associated with the first topic. In these and other embodiments, determining the similarity may further include obtaining a second term vector of numbers representing second term associated with the second topic and comparing the first term vector to the second term vector. Alternatively or additionally, determining the similarity may further include determining the similarity between the first topic and the second topic based on the comparison between the first term vector and the second term vector indicating that a similarity between the first term vector and the second term vector exceeds a threshold.

In some embodiments, determining the similarity between the first topic and the second topic may include obtaining a first topic vector representing multiple associations between first terms and the first topic. In these and other embodiments, determining the similarity may further include obtaining a second topic vector representing multiple associations between second terms and the second topic and determining the similarity may further include comparing the first topic vector to the second topic vector. In these and other embodiments, determining the similarity may further include determining the similarity between the first topic and the second topic based on the comparison between the first topic vector and the second topic vector indicating that a similarity between the first topic vector and the second topic vector exceeds a threshold.

In block 540, the multiple topics may be refined based on the similarity between the first topic and the second topic. The refining of the multiple topics of block 540 may include block 542 and block 544.

In block 542, the first set of electronic documents may be associated with the second topic. In some embodiments, the first set of electronic documents may be disassociated from the first topic.

In block 544, the first topic may be removed from the multiple topics. After the removal of the first topic, the remaining topics may be referred to as refined topics. In some embodiments, the refined topics may be the same as, or similar to the personal categories 122 of FIG. 1.

In block 550, a document-classifier model may be built. The document-classifier model may be built by applying machine learning to at least one electronic document associated with the second topic of the refined topics. In some embodiments, the document-classifier model may be the same as, or similar to, the document-classifier model 132 of FIG. 1. In some embodiments, the process of building the document-classifier model may be the same as, or similar to the machine-learning process 130 of FIG. 1. In some embodiments, the document-classifier model may be built by applying machine learning to at least one electronic document associated with each topic of the refined topics.

In some embodiments, another electronic document associated with the second topic may be selected to build the document-classifier model. The other electronic document may be selected based on a degree of association between the other electronic document and the second topics exceeding a threshold. In some embodiments, one additional electronic document associated with each topic of the refined topics may be selected to build the topic classifier model. The selection of the additional electronic documents may be based on the degree of association between the additional electronic documents and the refined topics to which the additional electronic documents are associated exceeding a threshold.

In block 560, an electronic document may be obtained. The electronic document may or may not be included in the multiple electronic documents obtained in block 510. In some embodiments, the electronic document obtained may be the same as, or similar to, the electronic documents 138 of FIG. 1.

In block 570, the electronic document may be classified into a topic of the refined topics using the document-classifier model. Following block 570, the electronic document may be provided for presentation on a display based on the classification of the electronic document. For example, the electronic document may be displayed with other electronic documents that have been classified according to the same topic.

Modifications, additions, or omissions may be made to the method 500 without departing from the scope of the present disclosure. For example, block 544 may be omitted. Further, the order of operations may vary according to different implementations.

One skilled in the art will appreciate that, for the process 100, the process 300, the process 400, and the method 500 and other processes and methods disclosed herein, the functions performed in the processes and methods may be implemented in differing order. Furthermore, the outlined steps and actions are only provided as examples, and some of the steps and actions may be optional, combined into fewer steps and actions, or expanded into additional steps and actions without detracting from the essence of the disclosed embodiments.

For example, the method 500 may further include obtaining a group of terms including a first term and a second term. The first term may be associated with the first topic and may be obtained from a first electronic document of the multiple electronic documents. The second term may be associated with the second topic and may be obtained from a second electronic document of the multiple electronic documents. The method 500 may further include adding a third topic to the refined topics. The third topic may be based on the group of terms. The third topic may be associated with the first electronic document and the second electronic document.

As another example, the method 500 may further include providing the second topic of the refined topics for presentation on a display. The method 500 may further include obtaining a confirmation relating to the second topic. The topic feedback described above may be an example of the confirmation. The method 500 may further include updating the topic-extraction model to include the second topic and analyzing the multiple electronic documents to obtain second multiple topics using the updated topic-extraction model including the second topic.

As another example, the method 500 may further include providing the electronic document for presentation on a display based on the classification of the electronic document and obtaining feedback relative to the electronic document. The document feedback described above may be an example of the feedback relative to the electronic document. The method 500 may further include identifying a third topic based on the feedback. The method 500 may further include updating the topic-extraction model to include the third topic based on the feedback and analyzing the multiple electronic documents to obtain second multiple topics using the updated topic-extraction model including the third topic.

Figure 6:
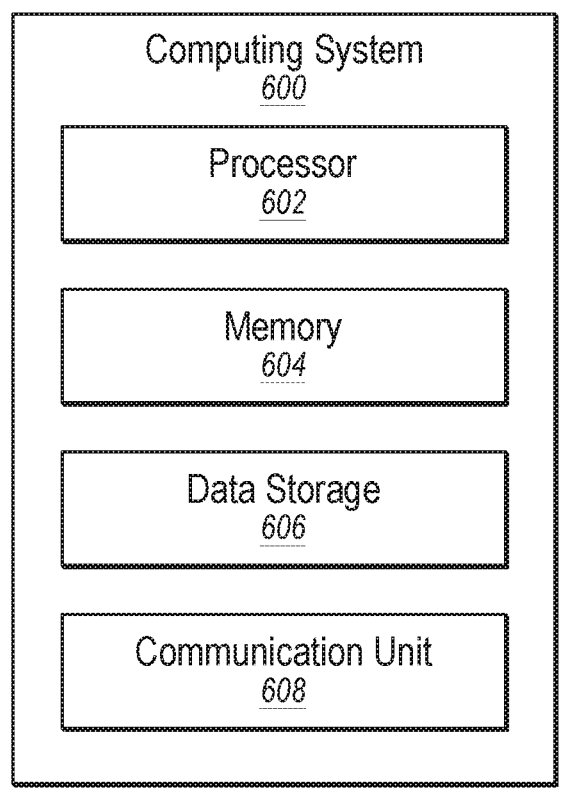
FIG. 6 is a block diagram of an example computing system that may be configured to analyze content of electronic documents.

FIG. 6 is a block diagram of an example computing system 600, which may be according to at least one embodiment described in this disclosure. As illustrated in FIG. 6, the computing system 600 may include a processor 602, a memory 604, a data storage 606, and a communication unit 608.

Generally, the processor 602 may include any suitable special-purpose or general-purpose computer, computing entity, or processing device including various computer hardware or software modules and may be configured to execute instructions stored on any applicable computer-readable storage media. For example, the processor 602 may include a microprocessor, a microcontroller, a digital signal processor (DS), an application-specific integrated circuit (ASIC), a Field-Programmable Gate Array (FPGA), or any other digital or analog circuitry configured to interpret and/or to execute program instructions and/or to process data. Although illustrated as a single processor in FIG. 6, it is understood that the processor 602 may include any number of processors distributed across any number of network or physical locations that are configured to perform individually or collectively any number of operations described herein. In some embodiments, the processor 602 may interpret and/or execute program instructions and/or process data stored in the memory 604, the data storage 606, or the memory 604 and the data storage 606. In some embodiments, the processor 602 may fetch program instructions from the data storage 606 and load the program instructions in the memory 604. After the program instructions are loaded into the memory 604, the processor 602 may execute the program instructions, such as instructions to perform one or more operations described with respect to the process 100, the process 300, the process 400, and/or the method 500 of FIGS. 1, 3, 4, and 5 respectively.

The memory 604 and the data storage 606 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 602. By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 602 to perform a certain operation or group of operations.

The communication unit 608 may be configured to receive electronic documents, topics, and/or feedback and to provide the electronic documents, topics, and/or feedback to the data storage 606. The communication unit 608 may be configured to receive records, data sets, and/or hypothetical data sets and to provide the records, data sets, and/or hypothetical data sets to the data storage 606. The communication unit 608 may include any device, system, component, or collection of components configured to allow or facilitate communication between the computing system 600 and a network. For example, the communication unit 608 may include, without limitation, a modem, a network card (wireless or wired), an infrared communication device, an optical communication device, a wireless communication device (such as an antenna), and/or chipset (such as a Bluetooth device, an 802.6 device (e.g. Metropolitan Area Network (MAN)), a Wi-Fi device, a WiMAX device, cellular communication facilities, etc.), and/or the like. The communication unit 608 may permit data to be exchanged with any such as a cellular network, a Wi-Fi network, a MAN, an optical network, etc., to name a few examples, and/or any other devices described in the present disclosure, including remote devices.

Modifications, additions, or omissions may be made to the computing system 600 without departing from the scope of the present disclosure. For example, the data storage 606 may be located in multiple locations and accessed by the processor 602 through a network.

As indicated above, the embodiments described herein may include the use of a special purpose or general purpose computer (e.g., the processor 602 of FIG. 6) including various computer hardware or software modules, as discussed in greater detail below. Further, as indicated above, embodiments described herein may be implemented using computer-readable media (e.g., the memory 604 of FIG. 6) for carrying or having computer-executable instructions or data structures stored thereon.

In some embodiments, the different components, modules, engines, and services described herein may be implemented as objects or processes that execute on a computing system (e.g., as separate threads). While some of the systems and methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method comprising:
   obtaining a plurality of electronic documents;
   analyzing, using a topic-extraction model, the plurality of electronic documents to obtain a plurality of topics and associate each of the plurality of electronic documents with at least one respective topic of the plurality of topics, the analyzing performed without initial topics being provided to the topic-extraction model;
   obtaining a first topic vector representing a plurality of associations between a first plurality of terms and a first topic of the plurality of topics and a second topic vector representing a plurality of associations between a second plurality of terms and a second topic of the plurality of topics;
   obtaining a first term vector of numbers representing a first term associated with the first topic and a second term vector of numbers representing a second term associated with the second topic;
   comparing the first topic vector to the second topic vector to generate a topic-vector similarity score;
   comparing the first term vector to the second term vector to generate a term-vector similarity score;
   combining the topic-vector similarity score with the term-vector similarity score to generate a combined similarity score;
   refining the plurality of topics based on the combined similarity score being greater than a threshold, the refining including associating a first set of the plurality of electronic documents with the second topic and removing the first topic from the plurality of topics;
   building a document-classifier model by applying machine learning to the plurality of electronic documents with at least one of the plurality of electronic documents associated with each of the refined plurality of topics, the document-classifier model configured to classify electronic documents according to the refined plurality of topics based on a designated purpose;
   obtaining a candidate electronic document;
   classifying the candidate electronic document into one of the refined plurality of topics using the document-classifier model;
   receiving a search request for electronic documents related to a search term;

designating the second topic as relevant based on the designated purpose of the document-classifier model the second topic being associated with the search term;

designating an additional topic as irrelevant based on the designated purpose of the document-classifier model the additional topic being associated with the search term; and returning an electronic document associated with the second topic as responsive to the search request.

2. The method of claim 1, wherein the first topic is associated with a first term obtained from a first electronic document of the plurality of electronic documents, the second topic is associated with a second term obtained from a second electronic document of the plurality of electronic documents, wherein the refining the plurality of topics further includes:

obtaining a group of terms including the first term and the second term; and adding a third topic to the refined plurality of topics, the third topic based on the group of terms, the third topic associated with the first electronic document and the second electronic document.

3. The method of claim 1, further comprising selecting another electronic document of the plurality of electronic documents associated with the second topic to build the document-classifier model, the other electronic document selected based on a degree of association between the other electronic document and the second topic exceeding a threshold.

4. The method of claim 1, further comprising providing the electronic document for presentation on a display based on the classification of the electronic document.

5. The method of claim 1, further comprising:

providing the second topic of the refined plurality of topics for presentation on a display;

obtaining a confirmation relating to the second topic;

updating the topic-extraction model to include the second topic; and analyzing the plurality of electronic documents to obtain a second plurality of topics using the updated topic-extraction model including the second topic.

6. The method of claim 1, further comprising:

providing the electronic document for presentation on a display based on the classification of the electronic document;

obtaining feedback relative to the electronic document, the feedback including a selection of a subset of content within the electronic document;

identifying a third topic based on the feedback;

updating the topic-extraction model to include the third topic based on the feedback; and analyzing the plurality of electronic documents to obtain a second plurality of topics using the updated topic-extraction model including the third topic.

7. The method of claim 6, wherein the subset of content comprises a title of the electronic document.

8. The method of claim 1, further comprising:

refining the plurality of topics based on the topic-vector similarity score being greater than a first threshold and the term-vector similarity score being greater than a second threshold.

9. At least one non-transitory computer-readable media configured to store one or more instructions that when executed by at least one processor cause or direct a system to perform operations, the operations comprising:

obtaining a plurality of electronic documents;

analyzing, using a topic-extraction model, the plurality of electronic documents to obtain a plurality of topics and associate each of the plurality of electronic documents with at least one respective topic of the plurality of topics, the analyzing performed without initial topics being provided to the topic-extraction model;

obtaining a first topic vector representing a plurality of associations between a first plurality of terms and a first topic of the plurality of topics and a second topic vector representing a plurality of associations between a second plurality of terms and a second topic of the plurality of topics;

obtaining a first term vector of numbers representing a first term associated with the first topic and a second term vector of numbers representing a second term associated with the second topic;

comparing the first topic vector to the second topic vector to generate a topic-vector similarity score;

comparing the first term vector to the second term vector to generate a term-vector similarity score;

combining the topic-vector similarity score with the term-vector similarity score to generate a combined similarity score;

refining the plurality of topics based on the combined similarity score being greater than a threshold, the refining including associating a first set of the plurality of electronic documents with the second topic and removing the first topic from the plurality of topics;

building a document-classifier model by applying machine learning to the plurality of electronic documents with at least one of the plurality of electronic documents associated with each of the refined plurality of topics, the document-classifier model configured to classify electronic documents according to the refined plurality of topics based on a designated purpose;

obtaining a candidate electronic document;

classifying the candidate electronic document into one of the refined plurality of topics using the document-classifier model;

receiving a search request for electronic documents related to a search term;

designating the second topic as relevant based on the designated purpose of the document-classifier model the second topic being associated with the search term;

designating an additional topic as irrelevant based on the designated purpose of the document-classifier model the additional topic being associated with the search term; and returning an electronic document associated with the second topic as responsive to the search request.

10. The non-transitory computer-readable media of claim 9, wherein the first topic is associated with a first term obtained from a first electronic document of the plurality of electronic documents, the second topic is associated with a second term obtained from a second electronic document of the plurality of electronic documents, wherein the refining the plurality of topics further includes:

obtaining a group of terms including the first term and the second term; and adding a third topic to the refined plurality of topics, the third topic based on the group of terms, the third topic associated with the first electronic document and the second electronic document.

11. The non-transitory computer-readable media of claim 9, further comprising selecting another electronic document of the plurality of electronic documents associated with the second topic to build the document-classifier model, the other electronic document selected based on a degree of association between the other electronic document and the second topic exceeding a threshold.

12. The non-transitory computer-readable media of claim 9, further comprising providing the electronic document for presentation on a display based on the classification of the electronic document.

13. The non-transitory computer-readable media of claim 9, further comprising:
providing the second topic of the refined plurality of topics for presentation on a display;
obtaining a confirmation relating to the second topic;
updating the topic-extraction model to include the second topic; and
analyzing the plurality of electronic documents to obtain a second plurality of topics using the updated topic-extraction model including the second topic.

14. The non-transitory computer-readable media of claim 9, further comprising:
providing the electronic document for presentation on a display based on the classification of the electronic document;
obtaining feedback relative to the electronic document, the feedback including a selection of a subset of content within the electronic document;
identifying a third topic based on the feedback;
updating the topic-extraction model to include the third topic based on the feedback; and
analyzing the plurality of electronic documents to obtain a second plurality of topics using the updated topic-extraction model including the third topic.

15. The non-transitory computer-readable media of claim 14, wherein the subset of content comprises a title of the electronic document.

16. The non-transitory computer-readable media of claim 9, further comprising:
refining the plurality of topics based on the topic-vector similarity score being greater than a first threshold and the term-vector similarity score being greater than a second threshold.

* * * * *